United States Patent [19]

Cogar et al.

[11] 3,794,980

[45] Feb. 26, 1974

[54] APPARATUS AND METHOD FOR CONTROLLING SEQUENTIAL EXECUTION OF INSTRUCTIONS AND NESTING OF SUBROUTINES IN A DATA PROCESSOR

[75] Inventors: George R. Cogar, Frankfort; Arnold G. Huyck, Middleville, both of N.Y.

[73] Assignee: Cogar Corporation, Wappingers Falls, N.Y.

[22] Filed: Apr. 21, 1971

[21] Appl. No.: 136,054

[52] U.S. Cl. .......... 340/172.5
[51] Int. Cl. .......... G06f 9/12
[58] Field of Search .......... 340/172.5

[56] References Cited

UNITED STATES PATENTS

| | | | |
|---|---|---|---|
| 3,348,211 | 10/1967 | Ghiron | 340/172.5 |
| 3,366,929 | 1/1968 | Mullery et al. | 340/172.5 |
| 3,461,434 | 8/1969 | Barton et al. | 340/172.5 |
| 3,548,384 | 12/1970 | Barton et al. | 340/172.5 |

*Primary Examiner*—Gareth D. Shaw
*Assistant Examiner*—Paul R. Woods
*Attorney, Agent, or Firm*—Harry M. Weiss, Gottlieb, Rackman & Reisman

[57] ABSTRACT

A stack pointer for identifying one of a group of instruction word address registers in a data processor. To fetch a new instruction, the stack pointer is examined to identify the instruction word address register to be used. The address contained in this register is then incremented to derive the address of the new instruction to be executed. A branch instruction causes the stack pointer to be incremented and the base address of the new subroutine to be loaded into the instruction word address register newly identified by the stack pointer. An exit instruction causes the stack pointer to be decremented. Exit-and-branch instructions are possible because the stack pointer counts in a closed loop in both directions, there being no "first" or "last" instruction word address register.

14 Claims, 3 Drawing Figures

INVENTORS
GEORGE R. COGAR
ARNOLD G. HUYCK
BY Gottlieb, Rackman & Reisman
Harry M Weiss
ATTORNEYS

FIG. 2

PROGRAM 1

| | | SP REG. | ADD. 0016 | ADD. 0017 | ADD. 0018 | ADD. 0019 |
|---|---|---|---|---|---|---|
| : | : | : | : | : | : | : |
| 1000 | | 0016 | 1000 (1) | 4567 | 5678 | 4578 |
| 1001 | | 0016 | 1001 | 4567 | 5678 | 4578 |
| 1002 | | 0016 | 1002 | 4567 | 5678 | 4578 |
| : | : | : | : | : | : | : |
| 1009 | | 0016 | 1009 | 4567 | 5678 | 4578 |
| 1010 | S&B:STORE 2000 | 0017 | 1010 | 2000 | 5678 | 4578 |
| 1011 | | 0016 | 1011 (7) | 2050 | 3040 | 4032 |
| : | : | : | : | : | : | : |
| 1060 | | 0016 | 1060 | 2050 | 3040 | 4032 |
| 1061 | | 0016 | 1061 | 2050 | 3040 | 4032 |
| : | : | : | : | : | : | : |

PROGRAM 2

| | | SP REG. | ADD. 0016 | ADD. 0017 | ADD. 0018 | ADD. 0019 |
|---|---|---|---|---|---|---|
| 2000 | | 0017 | 1010 | 2000 (2) | 5678 | 4578 |
| 2001 | | 0017 | 1010 | 2001 | 5678 | 4578 |
| : | : | : | : | : | : | : |
| 2019 | | 0017 | 1010 | 2019 | 5678 | 4578 |
| 2020 | S&B:STORE 3000 | 0018 | 1010 | 2020 | 3000 | 4578 |
| 2021 | | 0017 | 1010 | 2021 (6) | 3040 | 4032 |
| 2022 | | 0017 | 1010 | 2022 | 3040 | 4032 |
| : | : | : | : | : | : | : |
| 2049 | | 0017 | 1010 | 2049 | 3040 | 4032 |
| 2050 | EXIT | 0016 | 1010 | 2050 | 3040 | 4032 |

PROGRAM 3

| | | SP REG. | ADD. 0016 | ADD. 0017 | ADD. 0018 | ADD. 0019 |
|---|---|---|---|---|---|---|
| 3000 | | 0018 | 1010 | 2020 | 3000 (3) | 4578 |
| 3001 | | 0018 | 1010 | 2020 | 3001 | 4578 |
| : | : | : | : | : | : | : |
| 3014 | | 0018 | 1010 | 2020 | 3014 | 4578 |
| 3015 | S&B:STORE 4000 | 0019 | 1010 | 2020 | 3015 | 4000 |
| 3016 | | 0018 | 1010 | 2020 | 3016 (5) | 4032 |
| 3017 | | 0018 | 1010 | 2020 | 3017 | 4032 |
| : | : | : | : | : | : | : |
| 3039 | | 0018 | 1010 | 2020 | 3039 | 4032 |
| 3040 | EXIT | 0017 | 1010 | 2020 | 3040 | 4032 |

PROGRAM 4

| | | SP REG. | ADD. 0016 | ADD. 0017 | ADD. 0018 | ADD. 0019 |
|---|---|---|---|---|---|---|
| 4000 | | 0019 | 1010 | 2020 | 3015 | 4000 (4) |
| 4001 | | 0019 | 1010 | 2020 | 3015 | 4001 |
| : | : | : | : | : | : | : |
| : | : | : | : | : | : | : |
| 4031 | | 0019 | 1010 | 2020 | 3015 | 4031 |
| 4032 | EXIT | 0018 | 1010 | 2020 | 3015 | 4032 |

APPARATUS AND METHOD FOR CONTROLLING SEQUENTIAL EXECUTION OF INSTRUCTIONS AND NESTING OF SUBROUTINES IN A DATA PROCESSOR

This invention relates to data processors, and more particularly to an apparatus and method for controlling the sequential execution of instructions and the nesting of subroutines.

Many schemes have been devised for controlling the execution of successively addressed instructions by a data processor. When it becomes necessary to branch from one subroutine to another, the successively addressed instructions in the second subroutine are executed. But following the execution of this subroutine, it is often necessary to return to the first subroutine and to resume executing the instructions in it. A mechanism must be provided not only for controlling the sequential execution of successively addressed instructions in a subroutine, but also for keeping a record of the stacking of subroutines so that returns may be made to them in the proper order.

Many different systems have been designed for this purpose, the schemes for implementing branches and exits generally being combinations of hardware and software. One of the shortcomings of most prior art systems is that so many "bookkeeping" operations have been required that, as a rule, a considerable number of instructions stored in a machine have related to the proper nesting of subroutines. It is apparent that in the case of a machine having limited storage capacity it would be highly advantageous to provide for the proper nesting of subroutines in a way which required the use of a minimum amount of memory.

It is a general object of the present invention to provide a mechanism for controlling the sequential execution of successively addressed instructions in a subroutine and the proper nesting of subroutines, which requires the use of only a very small portion of the total memory.

Briefly, in accordance with the principles of the invention, a data processor is provided with a stack pointer (hardware-oriented rather than software-oriented) which is significantly different from that in any known commerical machine. The stack pointer can be thought of as a ring counter whose energized stage is advanced one stage in either direction only when a stack or an exit instruction is executed. (Rather than using a ring counter, the stack pointer is preferably a counter whose minimum and maximum counts are considered to follow each other depending on the direction of the count.) The state of the stack pointer identifies a particular one of a group of memory locations; each possible state of the stack pointer is associated with one respective memory location. Each of the memory locations contains the address of an instruction. The stack pointer in effect tells the data processor which of the special memory locations should be used to derive the address of the next instruction to be executed. At the start of a machine cycle, the address stored in the memory location specified by the stack pointer is incremented and it is this new address which identifies the next instruction to be executed. Each of the special memory locations serves as an instruction word address register, with one of them being incremented to determine the address of the next instruction. Whenever a branch is made to a lower-level subroutine, the stack pointer is advanced in one direction and the base address of the new subroutine is stored in that one of the special memory locations now identified by ths stack pointer. Whenever a return is made to a higher-level subroutine, the stack pointer is advanced in the opposite direction, the special memory location now identified by the stack pointer again being used to derive the addresses of successive instructions to be executed.

It is a feature of the invention to provide a stack pointer which identifies one of a predetermined number of special memory locations which function as instruction word address registers, the address in the identified memory location being incremented each time a new instruction is to be executed.

It is a further feature of the invention to increment the stack pointer and to store the base address of a new subroutine in the newly identified special memory location whenever a branch is made to a lower-level subroutine, and to decrement the stack pointer whenever a return is made to a higher-level subroutine.

Further objects, features and advantages of the invention will become apparent upon consideration of the following detailed description in conjunction with the drawing, in which:

FIG. 2 depicts the principles of the invention; and

Figure 1:
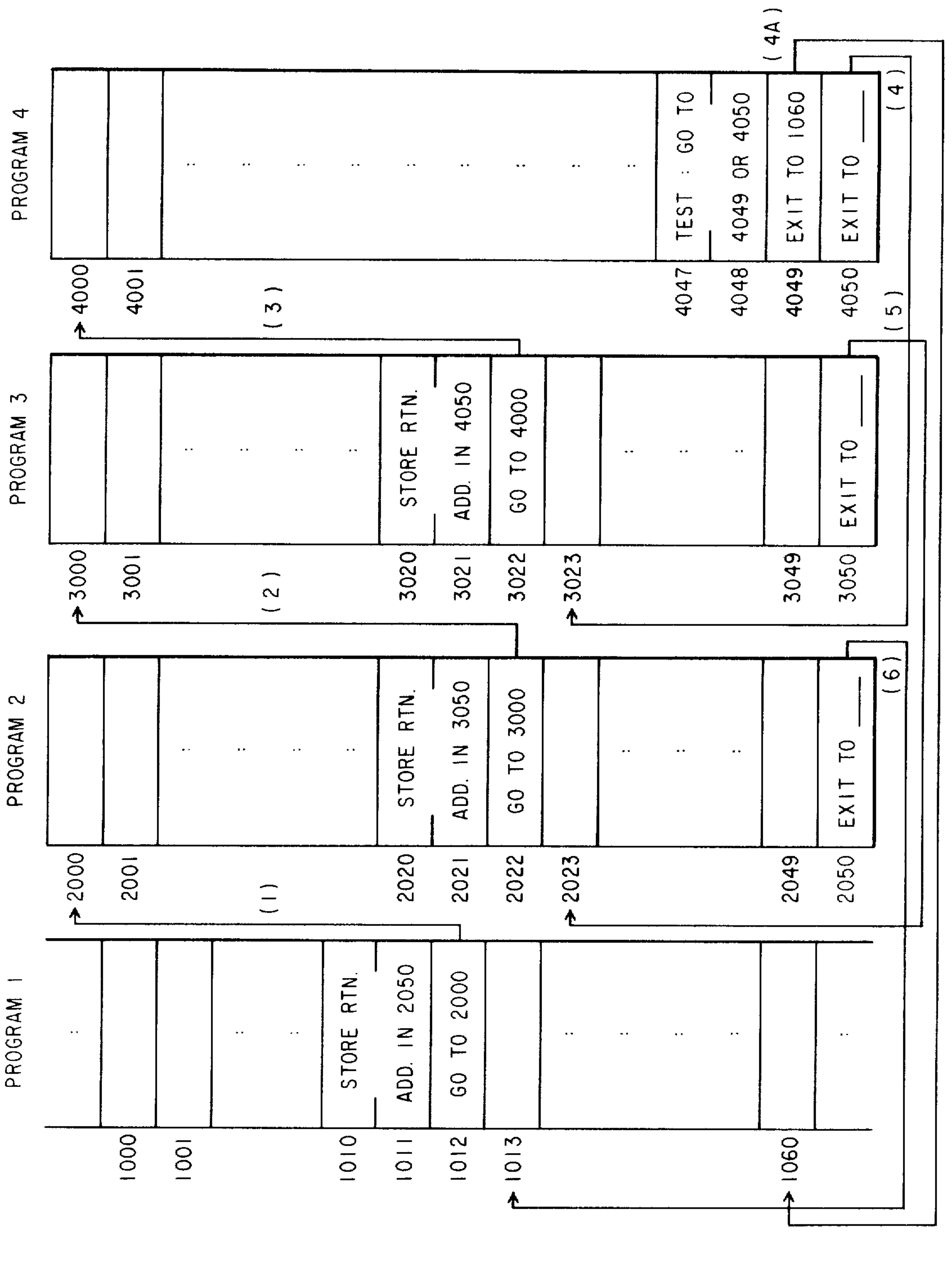
FIG. 1 depicts one way in which the nesting of subroutines has been accomplished in prior art machines.

FIG. 1 depicts one way in which the nesting of subroutines has been accomplished in prior art machines. Consider four programs, the first of which may be a supervisor and the other three of which may be subroutines. The addresses of the instruction locations for the four programs are 1000–, 2000–2050, 3000–3050 and 4000–4050. At the end of each of the three subroutines is an exit instruction with no initially specified return address. During execution of the supervisor program, a decision is made to branch to program 2. Before a branch is made, however, the return address to program 1 must be stored in the last instruction in program 2. Generally, at least two instructions are required for this purpose. For example, if the return address is 1013, the current instruction word address (e.g., 1010) must be obtained from an instruction word address register (which register is normally incremented prior to the execution of each instruction so that successive instructions are executed), and based on the current address the return address can be derived and written in the instruction contained in location 2050. Following the execution of at least two instructions required to derive and store the return address as described, the instruction in location 1012 is executed and it controls a branch to the first instruction in program 2.

During the execution of program 2, if it is determined to branch to program 3, the return address (2023) for program 2 must be stored in the program 3 instruction contained in location 3050. Similar remarks apply if a branch is made to location 4000 which contains the first instruction in program 4.

At the end of the execution of subroutine 4, the exit instruction in location 4050 controls a return to that point in program 3 from which the last branch was made. Similarly, at the end of program 3, a return is made to program 2, and finally a return is made to the main program. It will be noted that program 4 contains two instructions in locations 4047 and 4048, which based upon the results of a test cause either of two exit instructions to be executed. In the description above, it is assumed that the instruction in location 4050 is executed, and the sequence of branches and returns is (1)–(6) as shown in the drawing.

In many situations, a decision may be made during the execution of a low-level subroutine to return directly to an out-of-sequence instruction, such as that in location 1060, without having to go back through the two intermediate-level programs. In such a case, the sequence of branches and returns is (1)–(4A).

One of the main shortcomings of this conventional approach is that every subroutine from which a branch is to be made must include instructions which control the storing of a return address in the next lower level subroutine to be executed. In machines with relatively small memories and many short subroutines, as much as five percent of the memory may be required just to store instructions which control the proper nesting of subroutines.

In the prior art, "stack pointers" have been used as an alternative. However, these stack pointers are often nothing more than index registers each of which is essentially loaded with the base (first) address of a subroutine. When any subroutine is executed, the assigned index register is incremented prior to the execution of each instruction. But the same kind of "bookkeeping" operations (involving fetches, compares, etc.) are required; as a rule, a not insignificant portion of the total number of instructions stored in a machine relate to the proper nesting of subroutines.

FIG. 2 depicts some of the principles of operation of a stack pointer designed in accordance with the invention. The stack pointer may be a register which is incremented or decremented not during the execution of every instruction, but rather only when a stack or exit instruction is executed. The contents of the stack pointer identify a particular memory location. For example, four memory locations 0016 through 0019 might be assigned to work with the stack pointer. In such a case, the stack pointer would be designed to represent only one of the numbers 0016 through 0019.

These four special memory locations contain addresses of instructions to be executed. The stack pointer in effect tells the processor in which it is used which of the four special memory locations identifies the address of the next instruction to be executed. At the start of the execution of any instruction, the processor increments the number (address) stored in the memory location specified by the stack pointer and it is this new number which is the address of the instruction to be executed. The four memory locations serve as instruction word address registers, with one of them being incremented prior to the execution of any instruction. Whenever a branch is made to a lower-level subroutine, the stack pointer is incremented and the base address of the new subroutine is stored in the memory location now identified by the stack pointer. Whenever a return is made to a higher-level subroutine, the stack pointer is decremented.

The particular example of FIG. 2 is comparable to that of FIG. 1. Four programs are depicted; the supervisor program (1) is shown as including instructions stored in memory locations 1000–. The three subroutines are stored in respective locations 2000–2050, 3000–3050 and 4000–4032. The instruction in location 1010 controls a branch to location 2000, which latter location contains the first instruction in program 2. The branch instruction shown is "S & B: store 2000." A similar instruction is at address 2020 in program 2 and controls a branch to the instruction in location 3000, and a similar instruction at location 3015 in program 3 controls a branch to location 4000. At the end of each of the three subroutines is an exit instruction which controls a return to the next higher-level subroutine.

FIG. 2 also shows a column labeled "SP REG." This column shows the number stored in the stack pointer register following the execution of the instruction on the left in the same row. The four columns labeled "ADD. 0016" through "ADD. 0019" represent the contents of the four memory locations 0016 through 0019 following the execution of the instruction on the left in each row. (Each number in one of these four locations identifies an instruction word address.)

Several groups of instructions are bracketed and one of the numbers 1–7 appears adjacent to each bracket. A bracket indicates that the instructions contained at the addresses within the bracket are executed in sequence from top to bottom; the various groups of instructions are executed in the sequence shown by the numbers 1–7 adjacent to the brackets.

It is assumed that the stack pointer initially contains the number 0016. The stack pointer directs the processor to memory location 0016 for the address of the next instruction to be executed. Initially, the number stored in location 0016 is 999, but at the start of the next machine cycle the number is incremented. Thus as soon as the number in location 0016 is incremented, it identifies the number 1000 as the address of the instruction now to be executed. Locations 0017 through 0019 contain respective numbers 4567, 5678 and 4578, but these are of no moment and in no way affect the system operation as will become apparent below. The "important" numbers in locations 0016 through 0019 are those contained in the location which is functioning as an instruction word address register and the lower numbered locations as well; the numbers in the higher numbered ones of the four memory locations 0016–0019 are of no moment because when any one of these effective memory word address registers is eventually used, a new base address is immediately stored in it.

After the instruction at location 1000 is executed, the processor examines the stack pointer register and once again sees the number 0016. Its attention is thus directed to memory location 0016 for the address of the next instruction to be executed. Memory location 0016 contains the number 1000 at the end of the execution of the instruction stored at location 1000. But at the start of the next cycle the contents of location 0016 are incremented and thus address 1001 is identified. The instruction at this address is then executed. In a similar manner, the instructions at address 1002 through 1009 are executed in sequence. Throughout the process the stack pointer identifies memory location 0016, and at the end of the execution of each instruction the number remaining in memory location 0016 is the address of the instruction just executed.

After the instruction at address 1009 is executed, at the start of the next cycle, since the number in the stack pointer is 0016, the number in memory location 0016 is incremented. The incremented number is 1010 and consequently the instruction at address 1010 is executed. The instruction at this address is a stack-and-branch instruction which further identifies the number 2000. Two things take place. First the contents of the stack pointer register are incremented to 0017. Second, the number 2000 is stored in memory location 0017 (the new instruction word address register). During the next machine cycle, since the stack pointer identifies location 0017, and the number 2000 is in this location, the instruction at address 2000 is executed. (Unlike a normal cycle, when a stack-and-branch instruction is executed the number which is placed in the new instruction word address register is not incremented. It is for this reason that the number 2000, rather than 1999, is placed in the new instruction word address register.) It is thus apparent that a branch operation has taken place to subroutine 2. Furthermore, since the stack pointer now identifies memory location 0017 as the effective instruction word address register, it is the number in memory location 0017 which is incremented at the start of each subsequent machine cycle. As shown by the bracket labeled 2, the contents of memory location 0017 are continuously incremented to identify the addresses of successive instructions.

During the execution of the first part of program 2, the stack pointer contains a count of 0017 and the contents of memory location 0017 are constantly incremented from 2000 through 2019. At the same time, it should be noted that the contents of memory location 0016 are not changed. The number 1010 remains in this location since the stack pointer now identifies location 0017 as the location whose contents are to be incremented at the start of any machine cycle to derive the address of the next instruction to be executed. The number 1010 remains in memory location 0016; this is the address of the last instruction executed in the main program and it is thus available when a return is eventually made to the main program.

While the instructions at addresses 2000–2019 are being executed, the contents of memory location 0018 and 0019 also are not changed. This is of no importance, however, since these numbers are not required. (It will be recalled that the number at address 0017, namely, 4567, remained unchanged while memory location 0016 served as the effective instruction word address register. When the branch is made to program 2, the base address 2000 is stored in location 0017; the number 4567 which remained in location 0017 following the earlier execution of some subroutine is no longer required.)

After the instruction at address 2019 is executed, at the start of the next machine cycle, the contents of memory location 0017 are incremented to the number 2020; the instruction at address 2020 is executed. This instruction is another stack-and-branch instruction and the base address 3000 is identified. Consequently, the stack pointer register is incremented to the number 0018 and the base address 3000 is stored at memory location 0018. Thereafter, the first instruction in program 3 (at address 3000) is executed, as shown by the bracket labeled 3. Since the stack pointer now identifies memory location 0018, the last address 2020 in memory location 0017 remains there and is not changed. Thus the contents of memory location 0017 provide an indication of the return address to program 2, just as the contents of memory location 0016 provide an indication of the return address to program 1.

In a similar manner, the stack-and-branch instruction in program 3 at address 3015 controls a branch to program 4, with the stack pointer contents being incremented to 0019 and the base address 4000 being stored in memory location 0019. The number 3015 remains in memory location 0018 to provide an indication of the return address to program 3.

At the end of subroutine 4, there is stored an exit instruction at address 4032. An exit instruction simply causes the contents of the stack pointer to be decremented. Thus the number 0019 in the stack pointer is reduced to 0018. The system is now directed to memory location 0018 for the address of the next instruction to be executed. The initial contents of this memory location are 3015, this number having remained in location 0018 throughout the execution of program 4. At the start of the next cycle, this number is incremented to 3016 in the usual manner and it is the instruction at address 3016 which is executed. This is as it should be; a branch was made in program 3 from the instruction at address 3015 and when execution of the subroutine is resumed it should begin with the instruction at address 3016.

During the execution of the remaining instructions in program 3, the number 0018 stays in the stack pointer and it is thus the number (address) in memory location 0018 which is constantly incremented at the start of each machine cycle. As shown by bracket 5, the contents of memory location 0018 are incremented from 3016 through 3040. At the same time, the contents of the other three memory locations 0016, 0017 and 0019 remain unchanged. The numbers 1010 and 2020 must remain in memory locations 0016 and 0017 in order to identify the return addresses to programs 1 and 2. As for memory location 0019, the number 4032 remains at this location since this was the address of the last instruction executed in program 4, even though this number is not required any more. It is comparable to the number 4578 which was in memory location 0019 when the first instruction (at address 1000) was executed in the sequence described above.

When the exit instruction at address 3040 in program 3 is reached, the stack pointer is decremented once again to the value 0017. Thereafter, after it is incremented at the start of any cycle when a new instruction word address is to be derived, the number in memory location 0017 identifies the address of the next instruction to be executed. Immediately after the exit instruction at address 3040 is executed, at the start of the next cycle, the number 2020 at address 0017 is incremented and consequently the instruction at address 2021 is executed. Thereafter, the contents of memory location 0017 are continuously incremented and the last portion of program 2 is executed.

When the last instruction in program 2 is executed, the stack pointer is decremented once again to identify memory location 0016. At the start of the next cycle, the number 1010 at address 0016 is incremented, and the instruction at address 1011 is executed. The final instructions which are executed are those identified by bracket 7.

It is thus apparent that, compared with prior art systems, in accordance with the principles of the invention additional processing steps are required at the beginning of each machine cycle in order to determine the address of the next instruction to be executed. More specifically, the stack pointer must first be examined to determine the memory location which actually contains the address of the last instruction executed, and this address must then be incremented to derive the address of the current instruction to be executed. However, there is a considerable memory savings (at the expense of time). While in the prior art method described above at least two instructions were required for bookkeeping purposes whenever a branch instruction was executed, in accordance with the invention only a single stack-and-branch instruction is required. If there are 100 branch instructions stored in the memory at any time, only 100 memory locations are required to store all of the branch commands. The only additional memory locations which are required are locations 0016–0019. Of course, if provision is made for more than 4 nested subroutines, then additional memory locations must be allocated for the purpose, and the stack pointer must be capable of identifying the addresses of all of these locations.

The sequence described with reference to FIG. 2 is comparable to that shown by the branch and exit numbers (1)–(6) in FIG. 1. But if the stack pointer were an ordinary counter, it would not be possible to have a sequence (1)–(4A) in which a return is made directly to the main program without first going back through all of the nested subroutines. Instead, it would be necessary to decrement the stack pointer and to go through each of the intermediate-level subroutines until the main program is reached. Of course, in getting back to the main program, it would not be necessary to execute all of the instructions in each of the intermediate-level subroutines. For example, each of these subroutines could include an instruction sequence stored at locations starting with the return address, which sequence performs a test and, if a fast return is required, controls a jump to the exit instruction in the same subroutine. However, this would be timeconsuming and would require additional memory for storing the instructions which facilitate a fast return of this type. It is important to understand why, with an ordinary counter for the stack pointer, it is not possible to provide a direct return (a "branch and exit" instruction as opposed to an "exit" instruction).

Consider, for example, what would happen were provision made for a branch-and-exit instruction and were such an instruction included at address 3015 in program 3. The stack pointer identifies memory location 0018 as the instructions at the beginning of program 3 are executed. An exit instruction causes the stack pointer to be decremented and to thus identify memory location 0017. Of course, memory location 0017 contains in it the number 2020 which is not the proper return address if a direct return is to be made to program 1. For this reason, an exit-and-branch instruction must identify the return address as well. Thus the stack pointer would be decremented to 0017 and the return address (e.g., 1060) would be stored in location 0017. During the next machine cycle, the system would be directed by the stack pointer to memory location 0017, and the instruction at the specified address would be executed.

The system would now execute instructions in the main program but the stack pointer would identify memory location 0017 as the location to be looked to for the address of the current instruction to be executed. If the nesting of subroutines were now to begin once again, it is apparent that a maximum of only two subroutines could be nested since only two memory locations (0018 and 0019) would remain to have stored in them the base addresses of lower-level subroutines. In fact, it would no longer even be possible in most cases to use memory location 0016 as an effective instruction word address register since any return through nested subroutines to the main program would leave the number 0017 in the stack pointer. Furthermore, another direct return whereby another intermediate-level subroutine is skipped would result in the stack pointer identifying memory location 0018 which would then be used to identify instruction word addresses in the main program; thereafter, multiple subroutine nests would no longer be possible.

Of course, in an actual system, provision must be made for the nesting of more than three subroutines and thus typically more than four memory locations would be provided for working in conjunction with the stack pointer which would have a range of more than four counts. But unless all returns are made through all of the nested subroutines, the cumulative number of nested subroutines which are skipped during direct returns is the number by which the maximum number of subsequent nested subroutines is descreased. It is for this reason that were an ordinary counter used for the stack pointer, an exit-and-branch instruction could not be provided. Only an exit instruction could be provided, and direct returns (by by-passing intermediate-level nested subroutines) would not be possible.

In the illustrative embodiment of the invention (FIG. 3), while more than four locations such as 0016 through 0019 are provided and the stack pointer is incremented and decremented in a larger range, the principles of operation can be understood with reference to FIG. 2 and by considering only the four locations 0016–0019. An exit-and-branch instruction is made possible by providing a stack pointer which, in a manner of speaking, counts in a circle. If the stack pointer contains a count of 0019 and a stack-and-branch instruction is executed, then when the stack pointer is incremented the number 0016 replaces the number 0019 in the stack pointer. Similarly, if the stack pointer contains the number 0016 and an exit instruction or an exit-and-branch instruction is executed, then after the count in the stack pointer is decremented, the stack pointer contains the number 0019. In effect, the stack pointer is a "circular" counter where the numbers 0016 through 0019 can be thought of as being represented around a ring (with the numbers 0016 and 0019 being adjacent to each other), with the incrementing of the stack pointer causing an advance by one step around the ring in one direction and the decrementing of the stack pointer causing an advance by one step around the ring in the opposite direction. In effect, the stack pointer has a plurality of states each associated with one of the instruction word address registers, the states following each other in a closed loop sequence in both directions. The use of this type of counter, which can simply be a ring counter in which each stage when energized identifies a respective address (the addresses need not be successive), enables an exit-and-branch instruction to be provided for without direct returns resulting in a decrease in the maximum number of subsequently allowable nested subroutines.

Suppose, for example, that in the case of FIG. 2 an exit-and-branch instruction, identifying a return address of 1060, is contained in program 4. The stack pointer is decremented to 0018 and the number 1060 is stored in location 0018. Memory location 0018 is thus used to identify the addresses of successive instructions in the main program. After this, the first time that a stack-and-branch instruction is executed, the stack pointer is incremented to 0019 and memory location 0019 is used to identify the addresses of successive instructions in program 2. When a stack-and-branch instruction in program 2 is reached, the stack pointer is "incremented" to the value 0016 and the base address of the instructions in program 3 is stored in memory location 0016.

If an exit instruction in program 3 is now executed, the "decrementing" of the stack pointer results in the representation in that register of the value 0019. The system is directed to memory location 0019 which still contains the return address for program 2. Thus the fact that memory location 0018 was being used originally to identify successive addresses in the main program does not preclude the nesting of 3 subroutines because, as far as the system is concerned, there is no beginning or end to the memory locations identifiable by the stack pointer. There are four locations in all which can be thought of as being contained around a loop with no beginning or end. Any memory location can be used to identify successive addresses in the main program with the three other memory locations then identifying addresses in the nested subroutines.

Where the stack pointer is capable of identifying the values 0016–0031, any one of the 16 memory locations 0016–0031 can be used to identify addresses in the main program with the other 15 memory locations being capable of representing addresses in a maximum of 15 nested subroutines. The only limitation on the number of nested subroutines is the number of memory locations allocated to the stack pointer. Direct returns of the type symbolized by exit (4A) in FIG. 1 are possible and a machine can be provided with an exit-and-branch instruction.

Figure 3:
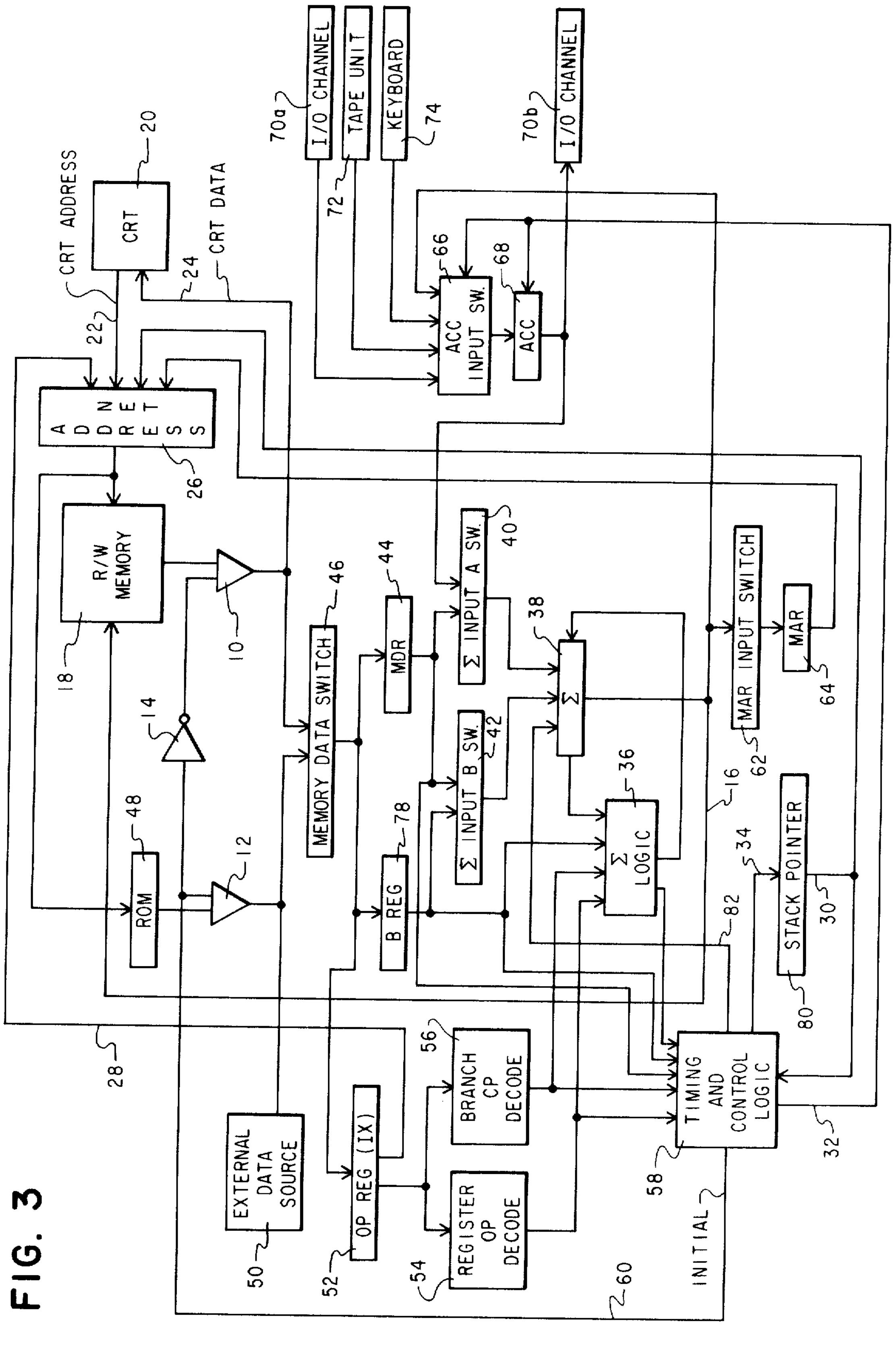
FIG. 3 depicts an illustrative data processor in which the apparatus and method of the invention are employed.

FIG. 3 depicts a block diagram of a processor which employs the stack pointer control of the invention. The processor includes a CRT 20, a tape unit 72 and a keyboard 74. An input-output channel 70*a,* 70*b* is also provided for allowing the processor to communicate with peripheral devices (printers, tape drives, etc.). The block diagram of FIG. 3 discloses only those elements required for a general understanding of the system operation. The timing and control logic 58 is not shown as being connected to all of the blocks to which it is in fact connected. The timing and control logic controls the orderly sequencing of the system and it is to be understood that timing signals are extended to most of the equipment blocks in the drawing.

The read-write memory 18 is organized as 2,048 eight-bit words. Accordingly, each word in the memory is identifiable by an eleven-bit address. Instruction words are sixteen-bits in length, and each instruction word is stored in two memory locations. The eight most significant bits are stored in one memory location and the eight least significant bits are stored in the next higher memory location. The addresses of each pair of half-instruction words are such that the least significant bit of the address of the most significant half is a 0 and the least significant bit of the address of the least significant half is a 1.

Instead of four memory locations comparable to locations 0016–0019 in FIG. 2, the system of FIG. 3 is provided with 16 such memory locations. It will be recalled that in each such location there is stored the address of an instruction word. Since each address consists of 11 bits, and each memory word is only eight bits in length, two successive memory locations are required to store each instruction word address. The first effective instruction word address register in the memory comprises memory locations 16 and 17. The next effective instruction word address register comprises memory locations 18 and 19, etc. At the start of each machine cycle, the stack pointer contains one of the values, 16, 18, ...,30. In order to retrieve the address of the last instruction which was executed, the stack pointer value is first used to control read-out of address bits 0–8 from the first half of the specified effective instruction word address register; an eight-bit word is retrieved from one of locations 16, 18, ..., 30. The stack pointer value is then used to read out the more significant adjacent word (in one of locations 17, 19, ..., 31) in order to retrieve the three most significant bits (9–11) in the address of the last instruction word which was executed. The overall address read out is increased by two and restored in the same two eight-bit memory locations so that the address of the instruction now to be executed (the old address plus two) will be available at the start of the next cycle. The reason for increasing the stored address by two, rather than by one, is that each instruction word stored in the machine is sixteen-bits in length and is contained in two memory locations. Accordingly, if successive instruction words are to be retrieved, it is necessary to identify every other memory location during successive cycles.

The stack pointer 80 is a three-position binary up-down counter. The value in the stack pointer register is extended to address net 26 and the three bits in the stack pointer are used as the three middle bits of a five-bit address. The most significant bit in the address formed at the start of each cycle is a one, this bit being jammed into the address net by timing and control logic 58. The first time that the stack pointer is used in a cycle — to retrieve the eight least significant address bits from one of the eight effective instruction word address registers — a zero is jammed into the least significant position of the address net. Thereafter, when the three most significant bits in the instruction word address contained in one of the effective instruction word address registers are retrieved, the timing and control logic jams a one in the least significant position of the address net. Consequently, at the start of each cycle, the address delivered through the address net to the memory is of the form 1—0 and it is immediately followed by the address 1—1. The three intermediate bits in both cases are determined by the stack pointer value. For example, if the stack pointer contains the value 001, the first memory location identified is decimal 18 and the second memory location identified is decimal 19. These two locations contain the address of a previously executed instruction, with memory location 18 containing the eight least significant bits of the instruction word address and memory location 19 containing the three most significant bits of the address. (The five most significant bits in each of memory locations 17, 19, ..., 31 are not used since only 11 bits are required for each address in the memory.)

At the start of each cycle, the 11-bit address read from the memory, after being increased by two, is stored in the memory address register (MAR) 64; this address is the address of the memory location containing the instruction now to be executed. The address which is contained in the MAR is the address of the memory location containing the most significant bits in the instruction word. These eight bits are then read out of the memory after which the eight least significant bits in the instruction word (in the next higher memory location) are read out. The most significant bits are read out first because they contain an operation code which, as will be described below, in effect determine in which registers the least significant bits in the instruction word (the literal) are stored.

As a specific example, consider memory locations 22 and 23 (decimal) as comprising the effective memory instruction word address register (comparable to one of locations 0016–0019 in FIG. 2) which is being used in the execution of a particular subroutine. The stack pointer in such a case would represent the value 011. At the start of each cycle, during a phase described below as I1, the stack pointer bits are extended to the address net and a one is jammed into bit 4 of the five-bit address and a zero is jammed into bit 0 of the address. Consequently, the address 10110 (decimal 22) is identified. As the word in memory location 22 is read out, the value 2 is added to it and the sum is stored in the eight low-order stages of the MAR. (A carry, if there is one, is saved by summer logic 36.) At the same time, the new value (the old value plus two) is stored back into memory location 22.

In the next phase of the cycle, to be described as I2 below, the word in location 23 is read out of the memory. The three least significant bits in the word are stored in the three high-order stages of the MAR. However, since the eight least significant bits of the address of the previously executed instruction were increased by two as they were retrieved during phase I1, a carry bit may have resulted. If it did, summer logic 36 increments the value read out of memory location 23. The new value (equal to the old value, or greater than it by unity) is stored both in the most significant stages of the MAR and in memory location 23. In this manner, the MAR contains the address of the current instruction word to be executed, which address is also contained in memory locations 22 and 23. The address in the MAR is now used to read out the two halves of the actual instruction to be executed.

It should be understood how the machine operates when it is first turned on. When power is first turned on, timing and control logic 58 energizes the "initial" conductor 60. This conductor enables gate 12 to the exclusion of gate 10. Nothing can be read from read-write memory 18, and instead instructions can only be read from the read-only memory 48. The read-only memory contains eight instructions which are read out successively and executed by the machine to control the reading in the data from one of the two tapes which can be inserted in tape unit 72. This tape contains instructions which are stored in the read-write memory for thereafter controlling the proper sequencing of the machine. After the initial instructions are read in, the "initial" conductor is de-energized and gate 10 operates to the exclusion of gate 12. All addresses generated through the address net thereafter control the reading of instruction and data words from the read-write memory rather than the read-only memory. The latter serves only in a bootstrap capacity to control the initial reading of a tape until sufficient instructions are stored in the machine to enable the normal operation to begin, a technique which will be understood by those skilled in the art.

Before proceeding with a description of the basic machine cycle, it will be helpful to briefly describe the function of each of the blocks of equipment in the system of FIG. 3. As described above, the read-write memory is a 2*k* memory requiring 11-bits binary addresses. Each 11-bit address can be generated from four independent sources which are selectively gated to the address net 26 to form the memory address. The first source is the MAR — an 11-bit storage register whose contents contain the current instruction word address. The second source is the stack pointer address (on cable 30), generated by the three bits in the stack pointer, a forced most significant bit of 1 and a least significant bit of 0 and 1 during phases I1 and I2 of each machine cycle. It is the stack pointer address which actually controls the fetching for the MAR of the current instruction word address. The third source of an address for the address net is from an index register (on cable 28). The OP register 52 holds an eight-bit word and, as will be described below, is the register into which the most significant half of each instruction word is stored. The three least significant bits in the register (IX) comprise an index register address which is used in indirect addressing. The fourth source (on cable 22) is from the CRT: the CRT address network gives the CRT logic access to the memory, as will be described below.

Gates 10 and 12 have been described above, and gate 14 simply operates as in inverter so that the "initial" signal on conductor 60 can control the operation of only one of the two gates. When either gate operates, the data read out from the respective memory is transmitted through the memory data switch 46 to selected ones of the OP register 52, the B register 78 and the MDR register 44 (as determined by the timing and control logic). At the appropriate times, data read out of the memory through gate 10 is also extended over the CRT data cable 24 to CRT 20. Also, external data from a source 50 can be extended through memory data switch 46 to the three registers as shown in FIG. 3.

The function of the memory data register (MDR) 44 is to hold data for the necessary time to allow updating of the stack pointer contents, formation of an effective address and arithmetic/logical operations. The B register serves to maintain the offset in the test and branch condition, to maintain the literal for an arithmetic operation on an index register, or to maintain the base address for formation of an effective address (to be described below). The OP register contains eight bits, the five higher order ones of which maintain the operation code of the instruction in process and the three lower order ones of which contain the address of the index register to be used in a register instruction or the number of places that the accumulator is to be shifted to the right.

The operation code is decoded by two decoders, one of which (54) determines the basic type of operation and the other of which (56) functions to control branches. Both decoders are extended to the timing and control logic 58 and the summer logic 36. The timing and control logic governs the system operation in accordance with signals (data, decoded instructions, etc.) delivered to it not only from the two decoders but also from the stack pointer, the summer logic, and the B and MDR registers.

The accumulator 68 is an eight-bit register on which arithmetic and logic operations are performed. The accumulator is also the data interface for all input/output operations. The output of the accumulator is extended to the I/O channel interface **70*b*. The four inputs to the accumulator are derived from the I/O channel interface 70*a*, the tape unit 72, a keyboard 74 and the output of summer 38 on cable 16. The operation of the accumulator is controlled by the timing and control logic over cable 32, commands on this cable also enabling accumulator input switch 66** to extend input data from a selected source to the accumulator.

Under control of the timing and control logic, the contents of the B register, the MDR and the accumulator can be extended through respective ones of the summer input A and B switches 40, 42 to the summer 38. The operation of the summer is controlled by the timing and control logic via the "adder control" line 82. The operation of the summer is further controlled by the summer logic 36. For example, a carry generated during phase I1 of each machine cycle is stored in the summer logic and is then added to the most significant part of the instruction word address read from the memory during phase I2 of each cycle. The contents of the B register are extended to the summer logic for controlling the operation of the summer in certain cases. The output of the summer on cable 16 is extended through the MAR input switch 62 (controlled by the timing and control logic) to the MAR (memory address register), to the accumulator, and to memory 18.

Stack pointer 80 can be incremented or decremented under control of the timing and control logic (by commands on cable 34) to control the execution of stack and exit instructions as will be described.

The first two phases of each machine cycle (which has at most nine phases) are designated I01 and I02. Normally, the CRT is not enabled to operate. However, when a CRT enable instruction is executed, the timing and control logic enables the CRT. During phases I01 and I02 of each cycle, the CRT derives information from the memory to update or refresh a portion of the display. The machine cycles are fast enough relative to the overall display and the amount of information which is updated or refreshed during each cycle to allow the entire display to be updated or refreshed often enough to avoid flicker. The operation of a display of this type is described in copending application Ser. No. 188,830, now U.S. Pat. No. 3,729,730 filed on Apr. 14, 1971, and entitled "Display System." For the purposes of the present invention, it is only necessary to understand that the first two phases of each machine cycle are used for the purposes of the CRT — but only if a CRT enable instruction has been executed earlier (and not followed by a CRT disable instruction sometime later). In the absence of a CRT enable instruction, phases I01 and I02 are not executed, and each machine cycle has at most seven phases.

During phase I1 (which follows phase I02 if the CRT has been enabled), the three-bit stack pointer value is used to control read-out from one of memory locations 16, 18, ...30 (decimal). The memory location contains the eight least significant bits of the address of a previously executed instruction. These bits are extended through the memory data switch 46, the MDR 44, the summer input A switch 40, the summer 38 and the MAR input switch 62 to the MAR 64. While the eight bits are transmitted through the summer, the summer logic 36 causes the value 2 to be added to the address so that the final bits stored in bit positions 0–7 of the MAR are the eight least significant bits of the address of the instruction now to be executed. These eight bits are also extended from the output of the summer to the data input of the memory over cable 16 where they are stored back in the same memory location from which they were read initially (as specified by the stack pointer). Any carry which is generated by the addition of two to the address is stored in the summer logic.

During phase I2, since a one is jammed into the least significant bit position of the address net, the next higher memory location is accessed and the three least significant bits in this location follow the same path through the system to positions 8–10 of the MAR. This time though, instead of adding two to the value read from the memory, the carry, if it was generated during phase I1, is added. The output of the summer is also extended over cable 16 to the memory and is stored back in the same memory location from which the three bits were read. The net result of the operation is that the two memory locations identified by the stack pointer together identify an 11-bit instruction word address — the address of the instruction now be be executed; this same instruction word address is contained in the MAR. The instruction word address stored in the MAR is actually the address of the memory location containing the most significant half (IWL) of the instruction word to be executed. (The least significant half of this instruction word — IWR — is contained in the next higher memory location.) An 11-bit instruction word address is stored in the MAR simply by having the timing and control logic cause the first word read from the memory during phase I1 to be stored in the eight least significant stages of the MAR and the three least significant bits of the second word read from the memory during phase I2 to be stored in the three next more significant stages of the MAR.

There is one variation in this sequence which should be noted at this time, although it will be described in further detail below. On test-and-offset instructions, during phase 11, rather than adding the value 2 to the word read from the memory before it is stored in the MAR and returned to the memory, it is possible to add an offset of up to plus or minus 30 (decimal). This operation is actually controlled by the summer logic which includes a "take branch" flip-flop (not shown). This flip-flop is set if the offset is to be added to the word read from the memory, the offset itself being contained in the B register and having been stored there during the execution of a previous instruction.

During the next phase — I3 — the MAR address is used to read out the most significant portion (IWL) of the instruction word to be executed. This eight-bit word is extended through the memory data switch 46 to the OP register 52, the B register 78 and the MDR 44.

During phase I4, the least significant part (IWR) of the instruction word is fetched and stored in the MDR. It thus replaces the IWL which was stored in the MDR during phase I3. In some cases the IWR is stored in the B register at the same time, and in other cases it is not extended to the B register by the memory data switch and the IWL remains in the B register. Whether the IWR is extended to the B register is determined by the value of the most significant bit of the operation code in the OP register. If the most significant bit is a zero, the IWR is not stored in the B register when it is stored in the MDR. If the most significant bit in the OP register is a one, the B register is loaded together with the MDR. The B register is loaded in anticipation of an arithmetic operation — if the most significant bit in the operation code is a one, it indicates that an arithmetic operation is to be performed.

It is thus apparent why the most significant half of each instruction word is first read from the memory; the most significant portion of the instruction word determines the kind of instruction to be performed and controls the storage of the least significant half of the instruction word in either the MDR alone, or both the MDR and the B register.

The IWL of each instruction word is stored in a memory location having a least significant bit of zero while the IWR is stored at the next higher address (the most significant and least significant halves of instruction words are stored in alternate memory locations). In order to control the reading of the IWR during phase I4, all that is required is for the timing and control logic to jam a one into the least significant bit position of the address net 26 so that the memory location which is accessed is actually the one after that represented in the MAR.

The last three phases of each machine cycle are designated E1, E2, and E3. Phases E1 and E2 take place only if data must still be fetched from the memory before the function specified by the operation code is performed. The fetching of a data word from memory during phases E1 and E2 takes place only if two conditions exist. It will be recalled that the left half of each instruction word is stored in the OP register and the right half of each instruction word is stored in the MDR. If the most significant bit in the operation code in the OP register is a zero, an arithmetic operation is not indicated and the IWL is left in the B register. However, if the bit is a one, an arithmetic operation is to be performed and the IWR is stored in the B register. The first condition necessary for phases E1 and E2 to take place is that the most significant bit in the OP register be a one; if an arithmetic operation is not to be performed there is no need to fetch data from the memory.

The second condition required for the two phases to occur is that the fourth least significant bit in the OP register also be a one. It will be recalled that the three least significant bits in the OP register comprise the index register (IX) base address. The fourth most significant bit is used to control whether phases E1 and E2 occur. If the bit is a zero, the two phases are skipped. Only if the bit value is a one are phases E1 and E2 controlled to fetch the indicated data word from memory.

During phase E1, the three bits in the IX portion of the OP register are sent to the address net over cable 28 and the memory word in the corresponding location (IX register) is read into the MDR. (The MDR initially contains the IWR, but since the IWR is in the B register when an arithmetic operation is to be performed, it can be overwritten in the MDR.) From the MDR, the contents of the IX register are sent through the summer input A switch 40 to the summer 38. At the same time, the six most significant bits in the B register are transmitted through the summer input B switch 42 to another of the summer inputs. However, in being transmitted through the summer input B switch, they are rotated six positions to the left. The rotated word from the input B switch is added to the IX register word in the summer and the result is stored in the MAR.

The two least significant bits in the B register are designated the *q* and *s* bits, and their functions will be described below. They do not form part of the base address of the IWR which is stored in the B register. It is only the six most significant bits in the IWR which represent the base address of the memory word to be fetched during phase E3. It should be noted that the left placement of six bits results in an overlap of the two least significant bits in the six-bit base address and the two most significant bits fetched from the IX register, and an overall address 12 bits in length (the most significant bit in the six-bit base address is a zero). By rotating six positions, the low order base address bits in the B register are added in the summer to the two bits in the hundreds position (in octal code) of the IX register word. The base address specified in the IWR is thus always a multiple of 100 (octal); the IX register specifies the tens and units positions (octal) of the address of the data word to be fetched. (The IX register word can also specify up to a value of three in the hundreds position of the final address.) The left rotate of six bits causes every base address to be a multiple of 100 (octal) and is for programming convenience.

The net result of this sequence is that the address of the data word to be fetched is stored in the MAR.

The contents of the IX register are stored in the MDR during phase E1. With index addressing, it is generally necessary to increment or decrement an index register so that when a following instruction is executed, the effective address which will be formed will be one that is adjacent to the previous address. There is no need to increment the IX register unless phase E1 has taken place. It is for this reason that phase E2 takes place only following phase E1, i.e., only if ones are contained in bit positions 3 and 7 of the oP register.

It will be recalled that the IWR is stored in the B register and that the six most significant bits are used in phase E1 as a base address. The least significant bit in the IWR is designated the *s* bit and the next least significant bit is designated the *q* bit. If the *q* bit is a one, the index register is incremented or decremented. If it is a zero, the index register is left as it was. Assuming that the *q* bit is a one, then if the *s* bit is a zero the index register is incremented, and if the *s* bit is a one the index register is decremented.

The *q* and *s* bits in the B register set respective controls in the summer logic 36. During phase E2, the contents of the index register are transmitted from the MDR through the summer input A switch to the summer. The summer logic then controls whether the value one is added to or subtracted from the index register value. The output of the summer is transmitted over cable 16 to the memory and the indexed value is stored in the same IX register since at this time the three IX bits in the OP register are still delivered to the address net over cable 28.

Phase E3 can take place whether or not phases E1 and E2 occur. In the case of an arithmetic operation which follows the execution of phases E1 and E2, the MAR contains the address of the data to be operated upon. The address is transmitted through the address net to the memory and the identified data word is read out through the memory data switch to the MDR and it is operated upon as specified by the operation code. Where data need not be fetched from the memory, the system simply performs the function specified by the operation code (e.g., using the literal in the MDR or rotating a word in the accumulator).

Following the completion of phase E3, a new cycle begins with phases I01 and I02 (if a CRT enable command was previously given), or with phase I1 (if the CRT enable command was not previously given). To further facilitate an understanding of the system, several illustrative instructions will be described. The following list is by no means exclusive but will serve to further explain the machine operation and the manner in which the stack pointer controls the sequential execution of instructions.

Block 48 is a conventional read only semiconductor memory being produced by many companies such as Fairchild, T.I., Motorola, etc. in the industry. Block 18 is a random access read/write memory having a single address and containing 4,048 words of eight Bits. Block 52 is a simple eight bit semiconductor storage register which stores the instruction (operation) (OP) during its execution. Block 64 (the memory address register —MAR) is a 14-bit semiconductor storage register which contains memory address of an instruction or data byte. Block 62 (MAR input switch) is a logic network which conditions the setting and resetting of the memory address register (MAR).

Block 26 (address net) — This is a simple address multiplexer function which selectively gates the plurality of memory address sources to form the read/write memory required. Single address. (An example of this is shown in the Texas Instruments Semiconductor Supplement of Mar. 15, 1970, page S10-3-attachment 1).

Block 54 (register OP decode) decodes the selected bits of the OP register (Block 52) to define a particular processor operation. In the subject system, the five most significant bits of the OP Reg. are defined as OP code or operation code. These five bits are decoded to 32 specific operations or instructions. (An example of this is shown in attachment 2 which is pages 55–7 to S5–14 of the T.I. Semiconductor Supplement).

Block 56 (branch OP decode) — Like Block 54, Block 56 decodes a subset of operations denoted as branch operation instructions (See Attachment 2).

Block 58 (timing and control logic) — The execution of any instruction requires a timing and control sequencer to successfully perform the function selected by the instruction. The instruction which is stored in the OP register is decoded by the OP register decode and conditions the hardware counters and gates contained in the timing and control logic function to provide the SYSTEM control necessary to execute the instruction. This is a conventional function (i.e., reference numeral 106 of U.S. Pat. No. 3,426,329).

Block 36 Σ Logic (adder control logic) — This Block functionally programs Block 38 or the adder to execute the selected instruction. Block 36 is controlled by the operation decode networks Block 54 and 56 and the timing and control sequencer logic Block 58. This adder logic function is also disclosed in U.S. Pat. No. 3,426,329 (reference number 103).

Block 38 Σ (Sum) (adder) — Block 38 functionally is two arithmetic logic units/function generator and is defined by the attached TI description. These two arithmetic units perform all the arithmetic functions of the SYSTEM. (i.e., attachment 3—S7-1 to S7-11 of the T.I. Supplement).

Illustrative Instructions

There are three general categories of instructions — branch, arithmetic and input/output. The latter instructions include conventional keyboard read, CRT enable, read and write tape, tape control, and I/O control instructions. The examples below are of the other two types since the stack pointer operation is most significant in regard to them.

BRANCH INSTRUCTIONS

On all branch instructions, phases I1, I2 and I3 are executed as described above. Since the operation codes for all branch instructions include a zero in the most significant position of the IWL, in phase I4 the IWR is loaded into the MDR, and the IWL remains in the B register. The IWL does not include the specification of an index register because there is no indexing when a branch instruction is executed. Instead, the three low-order bits in the IWL (stored in both the OP register and the B register) comprise the three most significant bits (8–10) of an address. The seven most significant bits in the MDR function as bits 1–7 of the address. Bit O in the MDR is not required to specify an address because all addresses specified on branch instructions by combining the IWL and IWR address bits are jammed with a zero in the least significant position.

The least significant bit of the IWR is used as an extension of the operation code. The summer logic 36 includes two flip-flops (not shown), one for representing whether the result of a previous comparison gave an equal or unequal condition, and the other of which represents whether the result of a previous comparison revealed that one number was greater than another. During the execution of a branch instruction, one of the two flip-flops is examined to determine whether a branch should take place. If the indicated flip-flop is set (as a result of a previous comparison), then the branch is taken; otherwise, the branch is not taken. (The setting of the flip-flops will be described in connection with the arithmetic instructions.) With these preliminary remarks, the specific branch instructions can be considered.

1. Stack-and-Branch Unconditional Instruction:

The stack-and-branch unconditional instruction (as well as other branch instructions) requires two machine cycles. The first simply entails the execution of phases I1 - I4 during which the IWL and IWR of the branch instruction are stored in the B register and the MDR, and the "take branch" flip-flop is set. Phases E1 - E3 of the first cycle are then skipped. It is during the next cycle that the branch address is actually formed, the new instruction is fetched and then stored in the OP, B and MDR registers, and the new instruction word address is stored in the new stack pointer location, following which phase E1 or phase E3 takes place depending on the operation code.

At the end of phase I4 of the first cycle, the "take branch" flip-flop in the summer logic is unconditionally set, the IWL is contained in the B register and the IWR is contained in the MDR. Phases E1, E2 and E3 are then skipped. At the start of the next cycle (the actual branch continues through two cycles although at the end of phase I4 of the second cycle the system is ready to execute the new instruction), what would normally happen during phase I1 is that the effective instruction word address register identified by the stack pointer would have its contents read out of memory into the MDR. However, the memory data switch is not operated at this time and the MDR remains undisturbed. At the end of phase I1, the seven most significant bits in the MDR are transmitted to bit positions 1–7 of the MAR. (The least significant bit in the IWR is not used and when the address in the MAR is eventually used, a zero is jammed into the least significant bit position of the address net.) In phase I2, what normally happens is that the first three bits in the second memory location used as the effective instruction word address register are read into bit positions 8–10 of the MAR. But when the "take branch" flip-flop is set, the memory data switch is not operated during phase I2, and instead the three low-order bits of the IWL in the B register are transmitted through the summer to bit positions 8–10 in the MAR. At the end of phase I2, the MAR thus has a 10-bit address in bit positions 1–10.

During phases I3 and I4, the contents of the MAR are used in the ordinary manner; the IWL of the new instruction is first read and stored in all three of the OP, B and MDR registers. Depending on the value of the most significant bit, the IWR is then read into only the MDR, or both the MDR and the B register. The instruction at the start of the new subroutine is thus contained in the OP, B and MDR registers, and depending on the operation code, the system enters phase E1 or E3.

On the stack instructions, timing and control logic 58 increments the stack pointer (by placing appropriate commands to this effect on cable 34) during phase I4 of the first cycle. It will be recalled that during the normal execution of phase I1, the value 2 is added to the contents of the MDR as they are transferred to the MAR, a carry bit is stored in the summer logic if it is generated, and the contents of the MAR are also stored back in the memory. This does not take place during phase I1 of the second cycle required to execute the stack-and-branch unconditional instruction. After the stack pointer has been incremented during phase I4 of the first cycle, gate 10 is not operated and the IRW in the MDR is operated upon rather than a newly read word from memory. The eight least significant bits in the address of the instruction to which the transfer is to be made are not increased by a value of two and are instead stored in the next higher effective memory instruction word address register now identified by the stack pointer during phase I1 of the next cycle. During phase I2, what normally happens is that the second half of the effective instruction word address register is read into the MDR, the carry is added to it, and the sum is stored in the most significant bit positions of the MAR. But when a stack-and-branch unconditional instruction is executed, the memory data switch is not operated. Instead, the three low-order bits in the B register are transmitted through the summer to bit positions 8–10 of the MAR. At the same time, they are transmitted over cable 16 to the memory where they are stored in the second half of the new effective instruction word address register identified by the stack pointer. In this manner, at the end of phase I2 of the second cycle, not only has the stack pointer been incremented, but the address of the first instruction in the new subroutine has been stored in the memory location newly identified by the stack pointer. This accomplishes the required stacking function described above. Since the address is also contained in the MAR, the new instruction is fetched from this location during phases I3 and I4.

2. Stack-and-Branch Conditional Instructions:

The summer logic includes two flip-flops designated "equal" and "greater". As a result of a previously executed instruction, one of these two flip-flops may be set. The stack-and-branch conditional instructions control a stack-and-branch operation of the type previously described only if a selected one of the two flip-flops is set.

It will be recalled that the least significant bit in the IWR is not part of the direct address in a stack-and-branch instruction. The three least significant bits in the IWL are part of the direct address, and the four most significant bits in the IWL define the operation code (including whether the branch is conditional or unconditional). The remaining bit in the IWL as well as the least significant bit in the IWR are used to define four conditions. Together they identify the flip-flop to be examined on a stack-and-branch conditional instruction, and they identify the value of this flip-flop which should control a branch. If the condition is satisfied, then the stack-and-branch instruction is executed as described above. If the condition is not satisfied, then during phase I4 of the first cycle involved in the execution of the branch instruction, the stack pointer is not incremented, and during phases I1 and I2 of the next cycle the memory data switch is not disabled. Consequently, the next instruction in the current sequence is read out of the memory and is executed in the normal manner.

3. Branch Direct Unconditional Instruction:

This instruction is the same as the stack-and-branch unconditional instruction except that the stack pointer is not incremented. A direct branch is made without incrementing the stack pointer. The net result is that the base address which is formed in the MAR is stored in the same effective instruction word address register in the memory which has been in use up to that time. Effectively, what happens is that in the nesting of subroutines the execution of this instruction simply replaces one subroutine in the nest by another without adding an additional level. It is thus possible to return to the adjacent higher-level subroutine with the execution of an exit instruction.

4. Branch Direct Conditional Instructions:

These instructions are similar to the branch direct unconditional instruction but whether a branch is taken depends on the condition of one of the "equal" and "greater" flip-flops. The relation of the branch direct conditional instructions to the branch direct unconditional instruction is the same as that of the stack-and-branch conditional instructions to the stack-and-branch unconditional instruction.

5. Exit Unconditional Instruction:

This instruction is executed in a manner similar to the stack-and-branch instruction, except that during phase I4 of the first cycle required for the instruction, the stack pointer is decremented rather than incremented. Furthermore, at the start of the next cycle, during phases I1 and I2, the memory data switch is allowed to operate in the ordinary manner. Therefore, an ordinary cycle takes place with the address of the next instruction to be executed being read out of the instruction word address register newly identified by the stack pointer. Since the stack pointer now identifies the instruction word address register containing the return address of the next higher-level subroutine, it is apparent that during the next cycle the instruction at the return address is read out of the memory and executed in the ordinary manner.

6. Exit Conditional Instructions:

These instructions are similar to the exit unconditional instruction except that the stack pointer is decremented only if the required one of the four conditions is met. If it is not satisfied, the stack pointer is not decremented, and the succeeding instruction in the subroutine being executed is the next one to be read out of the memory.

7. Exit-and-Branch Unconditional Instruction:

When this instruction is executed, the stack pointer is decremented. Also, during phases I1 and I2 of the second cycle, the memory data switch is not operated. Insted, the address which is formed in the MAR is derived from the B register and the MDR just as it is during the execution of the stack-and-branch unconditional instruction. It is this address which is stored in the newly identified instruction word address register specified by the stack pointer and it is the instruction stored at this address which is read out of the memory. As described above, it is the provision of a "circular" stack pointer which allows the exit-and-branch instruction to be provided. (Although the stack pointer is decremented during the execution of the instruction, it is not necessary to do so since the new base address could be stored in any instruction word address register since no additional returns are contemplated following the execution of an exit-and-branch instruction. However, since the stack pointer is decremented on exit instructions, it is simple to have the stack pointer decremented during the execution of an exit-and-branch instruction as well.)

8. Exit-and-Branch Conditional Instructions:

These instructions are similar to the exit-and branch unconditional instruction, except that the specified one of four conditions must be satisfied before the branch is taken. If it is not, the next instruction in the subroutine being executed will be retrieved in the ordinary manner as in the case of the stack-and-branch and branch direct conditional instructions.

9. Test-and-Branch Offset

This instruction allows a conditional branch to take place. The branch is to an instruction near the instruction being executed — the address of the new instruction can differ by no more than 15 from that of the present instruction. The stack pointer is not changed.

The IWR consists of an eight-bit literal. The IWL includes, in addition to an operation code, two code bits designated "a" and "p" and a four-bit offset. Phases I1 - I3 of the first cycle are as described for the general case. In phase I4, since the most significant bit in the operation code is a zero, the IWR is stored in the MDR only, and the IWL remains in the B register. Also, during phase I4, the IWR is transmitted through the summer input B switch (from the MDR) to the summer. At the same time, the eight-bit word in the accumulator is transmitted through the summer input A switch to the summer. The summer performs a designated comparison (which will be described below) and depending on the results of the comparison the "take branch" flip-flop in the summer logic can be set.

At the end of the first cycle (phases E1 - E3 are not executed), the stack pointer controls read-out from the lease significant half of the instruction word address register in current use. The normal sequence which takes place during phase I1 is that this eight-bit address is increased by two (with a carry bit, if it exists, being stored in the summer logic) and the new value is stored in the eight least significant bit positions of the MAR. However, when a test-and-offset instruction is executed, any one of three different operations can take place at this time depending upon the results of the previous comparison. If the "take branch" flip-flop is not set, the value of two is added to the eight-bit address in the normal manner and stored in the MAR; if the flip-flop is set the four-bit offset contained in the IWL (in the B register) is added to or subtracted from the eight-bit address and stored in the MAR and the first half of the instruction word address register identified by the stack pointer. Thereafter, in phase I2, the three most significant bits in the second half of the instruction word address register are read out under control of the stack pointer in the ordinary manner, the carry bit if it exists is added to them, and they are stored in bit positions 8–10 of the MAR and the second half of the same instruction word address register. Thereafter, the system operation is the usual — the new address in the MAR is used in phase I3 to read out the IWL of the new instruction and is then used in phase I4 to read out the IWR.

The comparison step which takes place during phase I4 of the first cycle entails a comparison of the literal contained in the MDR with the eight-bit word in the accumulator. If the "*a*" ($2^5$) bit in the IWL (in the B register) is a zero, all eight pairs of corresponding bits are compared together for an equality condition. If the "*a*" bit is a one, the only bits which are compared are those which are one in the literal, that is, the accumulator is checked to see if a one is contained in each bit position whose corresponding bit position in the literal is a one. No matter which of the two possible tests takes place, if an unequal condition is determined, then in the second cycle the instruction word address read from the memory location identified by the stack pointer is increased in the normal manner (by two). If an equality was detected, then if the P bit is a zero the offset is added to the low-order half of the instruction word address, and if the P bit is a one the offset is subtracted from it.

ARITHMETIC INSTRUCTIONS

On all arithmetic instructions, since the most significant bit in the IWL is a one, the IWR is stored in both the B register and the MDR during phase I4. Whether or not phases E1 and E2 are executed depends on the value of bit 3 in the IWL. Phases E1 and E2 simply control the formation of an index address and the indexing of a register. At the start of phase E3, if phases E1 and E2 took place ($2^3$ is a one), data is fetched and stored in the MDR. If phases E1 and E2 are skipped, at the start of phase E3 an index register word fetched from the memory or the word in the accumulator, together with the IWR (literal) which was previously in the MDR during phase I4, are used during execution of the instruction.

10. Load Index Register Instruction:

The eight-bit word stored in the MDR is transmitted through the summer input A switch and the summer over line 16 to the memory, where it is stored in the index register specified by the three low-order bits in the IWL contained in the OP register.

11. Add to Index Register Instruction:

After the instruction phases E1 and E2 have been executed, the B register contains the IWR. At the start of phase E3, the word in the memory location specified by the index register code in the OP register is read and stored in the MDR. The contents of the B register are then transmitted through the summer input B switch to the summer and the contents of the MDR are then gated through the summer input A switch to the summer. The two eight-bit words are added together and directed over line 16 back to the memory where they are stored in the same index register.

12. Subtract from Index Register Instruction:

This instruction is similar to the previous instruction except that the contents of the B register (the literal) are subtracted from the contents of the index register before the difference is stored back in the index register.

13. Compare Index Register Instruction:

In a similar manner, the contents of the B register and the contents of the specified index register are directed to the summer where a comparison takes place. Depending upon the operation code, the "equal" or "greater" flip-flop is set in accordance with the relative values of the two eight-bit words. It is the setting of one of the two flip-flops when this instruction is executed which controls whether or not a branch is taken on a subsequently executed conditional branch or exit instruction.

14. Load Instruction:

The contents of the MAR are used to read out an eight-bit word into the MDR. The eight-bit word is then transferred through the summer input A switch, the summer, and the accumulator input switch to the accumulator.

15. Store Instruction:

The contents of the accumulator are transferred through the summer input A switch and the summer over line 16 to the memory where they are stored in the location specified by the address in the MAR.

16. Add Instruction:

The contents of the memory location specified by the address in the MAR are read into the MDR and transferred through the summer input B switch to the summer. At the same time, the contents of the accumulator are gated through the summer input A switch to the summer. The sum at the output of the summer is transferred through the accumulator input switch to the accumulator.

17. Subtract Instruction:

This instruction is similar to the add instruction except that the contents of the MDR and the accumulator are subtracted from each other before the difference is stored back in the accumulator.

18. Compare Memory Instruction:

As in the add and subtract instructions, the contents of the memory location specified by the MAR are read into the MDR and transferred through the summer input B switch to the summer. The contents of the accumulator are similarly transferred through the summer input A switch to the summer. The two data words are then compared to each other as in the case of a compare index register instruction. Depending on the particular instruction, and the relative values of the two words, the "equal" or "greater" flip-flop can be set.

19. Shift and Logic Instructions:

There are many of these instructions which are basically the same as the arithmetic instructions considered above in which the accumulator word is transferred through the summer input A switch to the summer. The main difference is that prior to the transfer of the accumulator word to the summer, the accumulator word can be shifted by an amount specified in the instruction.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What is claimed is:

1. A data processor comprising a memory having instructions stored therein at successively addressed locations, a plurality of instruction word address registers, stack pointer means having a plurality of states each associated with a respective one of said instruction word address registers, the states of said stack pointer means following each other in a closed loop sequence in both directions, means for advancing the state of said stack pointer means in a fixed sequence in each direction, and means for determining the address of an instruction to be executed from the address contained in that one of said instruction word address registers whose associated state is represented by said stack pointer means.

2. A data processor in accordance with claim 1 further including means for incrementing the address contained in the instruction word address register represented by said stack pointer means each time an instruction is executed so that successively addressed instructions can be executed.

3. A data processor comprising means for storing instructions at respectively addressed locations, a plurality of instruction word address register means, circularly-operating stack pointer means for representing a plurality of sequentially selectable states each associated with a respective one of said instruction word address register means, and means for determining the address of an instruction to be executed from the address contained in that one of said instruction word address register means whose associated state is represented by said stack pointer means.

4. A data processor in accordance with claim 3 further including means for selectively incrementing the address contained in the instruction word address register means whose associated state is represented by said stack pointer means each time an instruction is executed so that successively addressed instructions can be executed.

5. A method for controlling the sequential execution of instructions by a data processor having instructions stored at respectively addressed locations, and a plurality of instruction word address registers, each of said instruction word address registers being associated with a respective one of a group of sequentially selectable system states, comprising the steps of:

1. identifying one of said system states,
2. examining the contents of the instruction word address register whose associated system state is identified in step (1) to determine the address of an instruction to be executed, and 3. changing the system state identified in step 1 to control a transfer to or from a subroutine, said system states having a closed-loop order such that a change in either of two directions from each one of said systems states causes a different respective one of said system states to be identified.

6. A method in accordance with claim 5 wherein step (2) includes incrementing the address contained in the instruction word address register which is examined.

7. A method in accordance with claim 5 further including the step of:

4. storing a base address in an instruction word address register when the system state identified in step (1) is first changed to the system state associated with the instruction word address register.

8, A method in accordance with claim 7 further including the step of:

5. selectively inhibiting the performance of step (4) and instead incrementing the address contained in the instruction word address register whose associated number is identified in step (1).

9. A data processor comprising means for storing instructions at respectively addressed locations, a plurality of instruction word address register means, stack pointer means for representing a plurality of ordered states each associated with a respective one of said instruction word address register means, means for advancing the state of said stack pointer means in either of two directions, said states being ordered such that an advance from each one of said states in either of said two directions causes a different respective one of said states to be represented by said stack pointer means, and means for determining the address of an instruction to be executed from the address contained in that one of said instruction word address register means whose associated state is represented by said stack pointer means.

10. A data processor in accordance with claim 9 further including means for selectively incrementing the address contained in the instruction word address register means whose associated state is represented by said stack pointer means each time an instruction is executed so that successively addressed instructions can be executed.

11. A method for controlling the sequential execution of instructions by a data processor having instructions stored at respectively addressed locations, and a plurality of instruction word address registers, each of said instruction word address registers being associated with a respective one of a group of sequentially selectable system states, comprising the steps of:

1. identifying one of said system states,
2. examining the contents of the instruction word address register whose associated system state is identified in step (1) to determine the address of an instruction to be executed, and
3. changing the system state identified in step (1) to control a transfer to or from a subroutine, said system states having an order such that a change in either of two directions from one of said system states causes a different respective one of said system states to be identified.

12. A method in accordance with claim 11 wherein step (2) includes incrementing the address contained in the instruction word address register which is examined.

13. A method in accordance with claim 11 further including the step of:

4. storing a base address in an instruction word address register when the system state idetified in step (1) is first changed to the system state associated with the instruction word address register.

14. A method in accordance with claim 13 further including the step of:

5. selectively inhibiting the performance of step (4) and instead incrementing the address contained in the instruction word address register whose associated number is identified in step (1).

* * * * *